United States Patent Office 3,450,860
Patented June 17, 1969

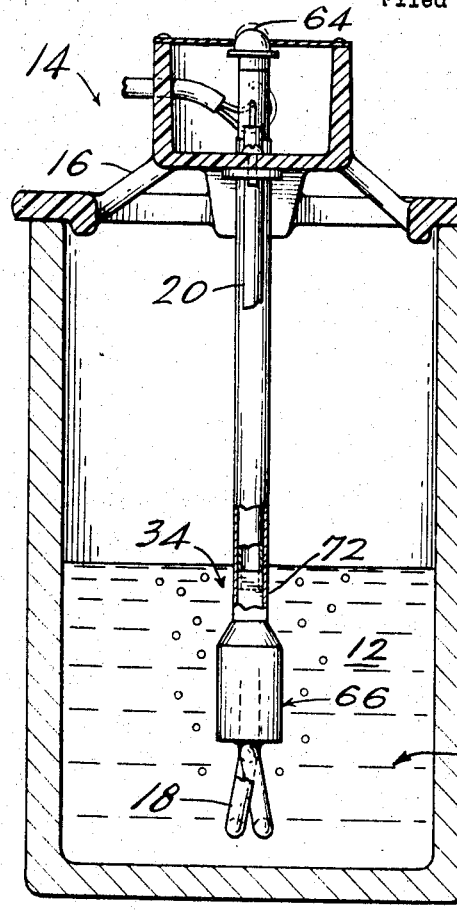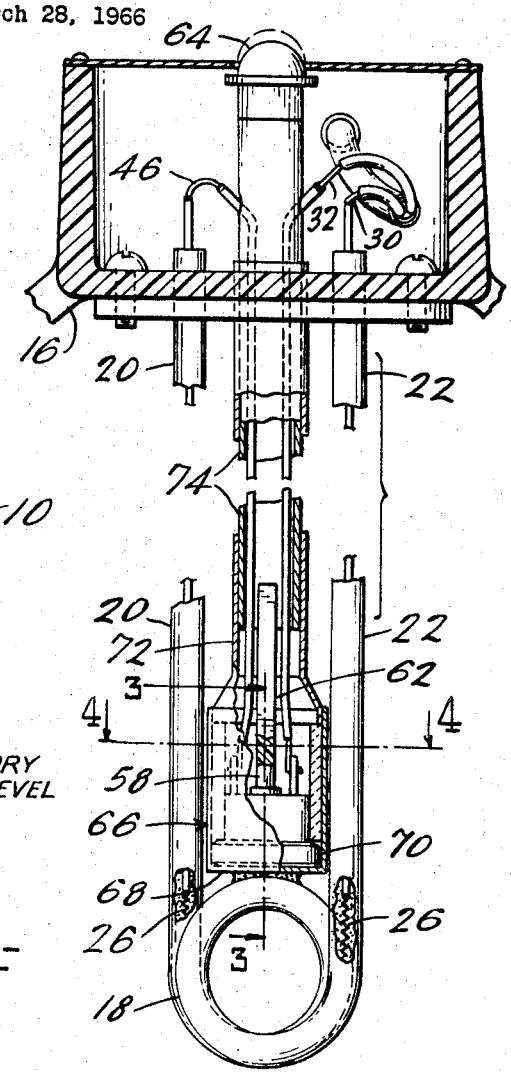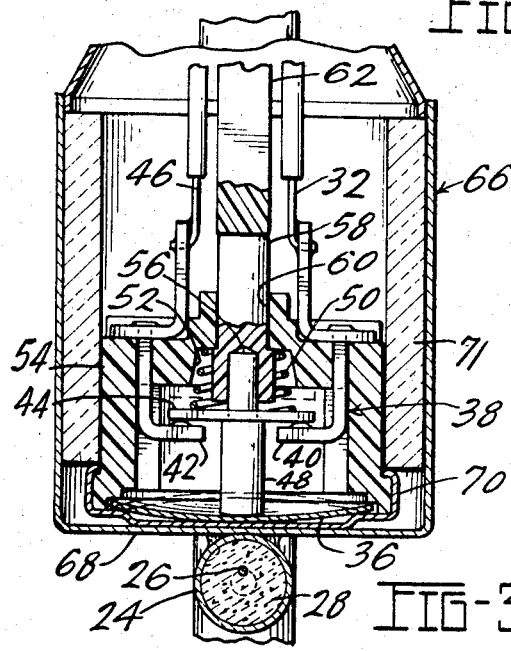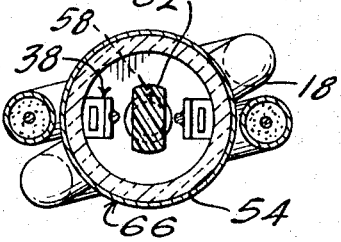
FIG-1-
FIG-2-
FIG-3-
FIG-4-
INVENTOR:
RICHARD F. KNEISLEY
BY
ATTYS.

3,450,860
LIQUID HEATER WITH HIGH TEMPERATURE SAFETY CONTROL
Richard F. Kneisley, Toledo, Ohio, assignor to The Kneisley Electric Company, Toledo, Ohio, a corporation of Ohio
Filed Mar. 28, 1966, Ser. No. 537,969
Int. Cl. H05b 1/00, 3/02, 11/06
U.S. Cl. 219—331                                1 Claim

ABSTRACT OF THE DISCLOSURE

A liquid heater, such as a vaporizer, is provided with a high temperature safety shutoff which is simple, reliable, and low in cost. A bimetallic element is located within a housing in thermal contact with the heater element and is effective to open and close a pair of adjacent contacts through a conducting plate, which contacts are in series with one of the leads for the heater element. A resetting shaft extends upwardly from the conducting plate to a point above the liquid container for purposes of manually resetting the bimetallic element. The heater, safety device, and resetting mechanism are all carried by a removable support mounted on top of the container.

---

This invention relates to a liquid heater and particularly to an immersion heater with a safety control for shutting off power to a heating element if the temperature rises excessively.

Although immersion heaters are well known in the art, they seldom have been equipped with safety control devices. In a common type of immersion heater, a pair of bare electrodes are immersed in the liquid to be heated, with current passing through the liquid acting as an electrolyte between the electrodes. When the level of the liquid drops below the lower ends of the electrodes, the heating stops since the path of current is eliminated. While immersion heaters of this type thereby have a built-in safety device, they have the disadvantage that as the level of the liquid lowers, the resistance of the path of current increases and the heating capacity of the heater decreases. Also, immersion heaters of this type depend upon the conductivity of the liquid for heating and if the conductivity is exceptionally good, the current flow can be excessive and dangerous.

The present invention relates to an immersion heater designed to heat a small portion of the liquid in a lower part of a pool of the liquid. The heating element supplies a constant amount of heat to the liquid independently of the level of the liquid and independently of the degree of conductivity thereof. With this immersion heater, however, when the level of the liquid drops below the element, the portion of the element exposed to air or other gas above the level of the liquid tends to overheat and can burn out in a short time in the absence of the liquid conducting heat therefrom.

To overcome this problem, the immersion heater in accordance with the invention has a safety control device which automatically shuts off the power to the heating element when the level of the liquid drops to a level exposing a portion of the element as during periods of prolonged, unattended use. The control device includes a bimetallic disc or strip in thermal contact with the heating element and electrical contacts in series with the heating element and operated by the bimetallic element. The control device further includes means for manually resetting the bimetallic element if tripped, when the liquid has been replenished and heating is again desired.

It is, therefore, a principal object of the invention to provide an improved immersion heater with a safety control device for shutting off power if the level of the liquid drops sufficiently to expose a heating element of the heater during periods of prolonged unattended use.

Another object of the invention is to provide an immersion heater with a safety control device which shuts off power to the heating element if the temperature rises excessively, and which has manually-operated reset means.

Many other objects and advantages of the invention will be apparent from the following detailed description of a preferred embodiment thereof, reference being made to the accompanying drawing, in which:

FIG. 1 is a view in vertical cross section of a liquid container and an immersion heater embodying the invention;

FIG. 2 is a fragmentary view in elevation, with parts broken away and with parts in cross section, of the immersion heater of FIG. 1;

FIG. 3 is a further enlarged, fragmentary view in vertical cross section of a safety control device constituting part of the immersion heater; and FIG. 4 is a view in horizontal cross section taken along the line 4—4 of FIG. 2.

Referring particularly to FIG. 1, a container 10 of any suitable design has a pool 12 of liquid shown at an intermediate level, with a dry level labeled accordingly. An immersion heater embodying the invention is indicated at 14 and is supported on the top of the container 10 by a suitable bracket or support 16. A heating element 18 is located in a lower portion of the liquid and consists of a resistance coil having a pair of leads or conductors 20 and 22 extending upwardly therefrom through the support 16. The heating element 18, as shown in FIGS. 2 and 3, includes an outer metal cover 24 and an electrical resistance wire 26 electrically insulated from the metal cover 24 by insulation 28. This type of construction for heating elements is well known in the art and will not be discussed in detail. Power for the element 18 is supplied from a suitable source through flexible conductors 30 and 32 located above the support 16.

With the immersion element 18, heating is independent of the level and conductivity of the liquid. If, over a period of prolonged, unattended use, the level of the liquid drops to the dry level, part of the coil 18 will be exposed to air or gas above the liquid. The coil will then tend to overheat rapidly since the heat is not conducted away from the coil 18 by the air or gas as rapidly as by the liquid. In such an instance, if the power to the coil 18 is not shut off quickly, the coil will overheat and the element will burn out.

To overcome the above possibility, a safety device indicated at 34 is employed. The device 34 includes a bimetallic sensing element such as disc or strip 36 (FIG. 3) which, when the temperature sensed by it is below a predetermined amount, is in a concave position as viewed from above and as shown in FIG. 3. If the temperature sensed by the element 36, however, rises to or above a predetermined amount, the element will snap to a convex position, as viewed from above. When the element 36 is in the lower position, a switch indicated at 38 is closed and when the element is moved to the second, convex position, the switch is opened. The switch 38 comprises a pair of contacts 40 and 42 which can be electrically connected by a conducting plate or member 44. With the switch closed, the flexible conductor 32 is electrically connected to a third conductor 46 which connects the coil 18 with the power source through the wire 26 of the lead 20.

The conducting member 44 moves up and down with the element 36 by means of a connecting stub shaft 48 of non-conducting material attached to a central portion of the member 44. The stub shaft 48 is maintained in engagement with a central portion of the bimetallic element 36 by means of a coil spring 50 or other suitable resilient means located above the plate 44 and seated in a recess 52 of a supporting body 54. A pin 56 extends upwardly from the plate 44 above the shaft 48 and connects with a plunger 58 extending upwardly through an opening 60 in the supporting body 54.

When the element 36 is heated sufficiently, it snaps to the second, convex position, thereby disconnecting the switch 38 by moving the plate 44 out of electrical engagement with the contacts 40 and 42. The element then remains in the second position even when the temperature drops below the desired level until the plunger is manually pushed downwardly to force the element 36 back to the first, concave position. The resetting operation can be accomplished through a long stem or rod 62 which extends above the bracket 16 and terminates in a push button 64. The button 64 can be pressed downwardly by an operator to reset the element 36 and the switch 38 when a heating operation is to be initiated once more.

In a preferred form, the bimetallic element 36 and the switch 38 are located in an outer housing 66 having a bottom wall 68 in thermal contact with the coil 18, the two preferably being brazed together, as shown in FIG. 3. A metal supporting wall 70, in turn, is held in thermal contact with the bottom wall 68 by an insulating sleeve 71 and is recessed to support end portions of the element 36, whether in its first or second position. The element 36 is held in position by the supporting body 54 and has a central portion in contact with the wall 70 when in its normal position. The outer housing 66 can be affixed to a connecting tube 72 (FIG. 2) which is connected to a tube extension 74 extending above the bracket 16 to protect the safety elements and to maintain them dry. The above-discussed housing components are not essential, however, particularly if the stub shaft 48 is lengthened and the switch 38 is positioned above the initial level of the liquid, in which case the bimetallic element 36 can be immersed directly in the liquid along with the heating element 18.

Various modifications of the above-described embodiment of the invention will be apparent to those skilled in the art, and it is to be understood that such modifications can be made without departing from the scope of the invention, if they are within the spirit and the tenor of the accompanying claim.

I claim:
1. Apparatus for heating liquid to an elevated temperature and for stopping heating of the liquid if the level thereof drops below a generally predetermined point after a period of prolonged, unattended use, said apparatus comprising a container having an open top, a support carried by the top of said container, a resistance-heating electrical coil adapted to be disposed in a lower portion of the pool of liquid in said container to be heated, a pair of leads electrically connected to said coil and of sufficient length to extend upwardly above the initial level of the liquid and above said support, said leads also supporting said coil from said support, a safety device for shutting off power to said coil if the temperature thereof rises excessively, said device comprising a metal, liquid-tight housing having a wall in direct thermal contact with upper portions of said coil, metal supporting means in said housing, means in said housing for holding said metal supporting means in thermal contact with said housing wall, a connecting tube affixed to an upper portion of said liquid-tight housing and extending upwardly above the initial level of the liquid to said support for supporting said housing from said support, a bimetallic element having spaced portions supported by and in thermal contact with said metal supporting means, a pair of electrical contacts in said housing in series with one of said leads for said coil and located above said bimetallic element, a conducting plate located above said contacts and operatively connecting said contacts when in one position, a stub shaft carried by said conducting plate and extending downwardly between said contacts to an intermediate portion of said bimetallic element between the portions in thermal contact with said metal supporting means, said contacts being closed by said conducting plate when said bimetallic element is in a first, concave position as viewed from above and said contacts being opened by said conducting plate when said bimetallic element is in a second, convex position as viewed from above, said bimetallic element moving from said first position to said second position when the temperature sensed thereby attains a predetermined level when the level of the liqiud being heated drops below the upper portion of said electrical coil, a spring carried in said liquid-tight housing and urging said conducting plate toward said contacts, said bimetallic element being effective to overcome the force of said spring when moved from said first position to said second position, and a connecting shaft engageable with said conducting plate and extending upwardly through said connecting tube to a position above said support to enable said conducting plate to be manually moved into engagement with said contacts and to reset said bimetallic element to said first position after said element has moved to the second position.

References Cited
UNITED STATES PATENTS

| | | | |
|---|---|---|---|
| 2,076,709 | 4/1937 | Deutsch | 219—335 X |
| 2,489,560 | 11/1949 | Brown | 219—441 |
| 2,834,869 | 5/1958 | Stiebel | 219—437 |
| 2,866,884 | 12/1958 | Minier | 219—331 X |
| 3,272,946 | 9/1966 | Manecke | 200—138 |
| 3,278,395 | 10/1966 | Rubinowitz | 219—272 X |

FOREIGN PATENTS

| | | |
|---|---|---|
| 31,353 | 9/1964 | Germany. |
| 867,647 | 8/1941 | France. |

ANTHONY BARTIS, *Primary Examiner.*

U.S. Cl. X.R.

219—523, 272, 437, 322; 337—367